(12) United States Patent
Vogt

(10) Patent No.: US 7,013,752 B2
(45) Date of Patent: Mar. 21, 2006

(54) ROTATABLE KNOB FOR THE FIXATION OF AN APPARATUS SUPPORT

(76) Inventor: Philippe Vogt, Frohalpstrasse 65, CH-8038 Zurich (CH)

( * ) Notice: Subject to any disclaimer, the term of this patent is extended or adjusted under 35 U.S.C. 154(b) by 432 days.

(21) Appl. No.: 10/452,169

(22) Filed: May 30, 2003

(65) Prior Publication Data
US 2003/0221510 A1 Dec. 4, 2003

(30) Foreign Application Priority Data
May 31, 2002 (EP) .................................. 02405440

(51) Int. Cl.
G05G 1/10 (2006.01)
(52) U.S. Cl. ..................................................... 74/553
(58) Field of Classification Search .................... 74/553
See application file for complete search history.

(56) References Cited
U.S. PATENT DOCUMENTS

| 2,719,690 | A |   | 10/1955 | Zucker ..................... 248/183.3 |
| 2,998,733 | A |   | 9/1961  | Thompson ................... 74/553 |
| 3,570,531 | A | * | 3/1971  | McGay ....................... 137/556 |
| 3,759,424 | A | * | 9/1973  | Maddock ..................... 222/309 |
| 4,012,966 | A | * | 3/1977  | Lieberman et al. ........... 74/553 |
| 4,154,125 | A |   | 5/1979  | Frank ........................... 74/553 |
| 4,208,930 | A | * | 6/1980  | Hermann ..................... 82/145 |
| 5,072,907 | A |   | 12/1991 | Vogt .......................... 248/181.1 |
| 5,906,141 | A | * | 5/1999  | Abdelmoula ................. 74/553 |
| 6,352,228 | B1|   | 3/2002  | Buerklin ................... 248/181.1 |

* cited by examiner

Primary Examiner—Chong H. Kim
(74) Attorney, Agent, or Firm—Abelman, Frayne & Schwab

(57) ABSTRACT

A rotatable knob for fixation of an apparatus support includes a knob shell (1), a coupling part (2) for the connection of the knob shell to the spindle, a sleeve (3) which is connectable to the housing, a cover disc (4) which is secured by the sleeve (3) to the housing, a screw (5) arranged in the knob shell (1) for the setting of the holding force and a clamping disc (6) which cooperates with the knob shell (1) and the sleeve (3). The clamping disc (6) is guided in the knob shell (1) and is rotatably arranged on the sleeve (3) so that, on rotation of the knob shell, (1) the clamping disc (6) executes a synchronous rotary movement with the knob shell (1) and the linear movement with respect to the knob shell (1).

7 Claims, 3 Drawing Sheets

ROTATABLE KNOB FOR THE FIXATION OF AN APPARATUS SUPPORT

BACKGROUND OF THE INVENTION

1. Field of the Invention

The invention relates to a rotatable knob for the fixation of an apparatus support.

2. Description of the Prior Art

FIG. 1 shows a known rotatable knob for the fixation of an apparatus support in a housing by means of a clamping device having a spindle. The rotatable knob is mounted on the housing and also on the spindle. The rotatable knob comprises a knob shell 1 having an inner thread, a coupling part 2 for connecting the knob shell 1 to the spindle, a sleeve 3 which can be connected to the housing, a cover disc 4 which is secured to the housing by the sleeve 3, a screw 5 for setting the holding force, the screw being arranged in the knob shell 1 and a clamping disc 6 which has an outer thread standing in engagement with the inner thread of the knob shell and which is guided on the sleeve 3 in such a way that the clamping disc 6 executes a relative movement with respect to the knob shell 1 by rotation of the knob shell 1.

For the fixation of the apparatus support the knob shell 1 is turned in the clock-wise sense. In this way the clamping device is actuated by the spindle and the clamping disc 6 is displaced axially until the apparatus support is fixed. By screwing in the screw 5 until it contacts the clamping disc 6 the position of the clamping disc which corresponds to the required holding force for the apparatus support is set. If apparatuses are used for which different holding forces are required the position is in each case set anew. With renewed fixing of the apparatus support the clamping disc is displaced until it contacts the screw 5 and a rotation of the knob shell 1 is thereby prevented. Thus the apparatus support is fixed.

When using the rotatable knob it has turned out that with incorrect handling, in particular with an excessive use of force the knob shell 1 can be turned further beyond the position corresponding to the holding force which has been set. In this way the clamping disc 6 is pressed against the screw 5 and jams in the thread turns. In this way the knob shell 1 and the clamping disc 6 are mutually blocked and indeed in such a way that the rotatable knob can no longer be turned. The consequence resulting from this is that the rotatable knob has to be completely replaced. Moreover the clamping action at the apparatus support can be influenced disadvantageously so that the apparatus support blocks or is not correctly fixed.

The invention is based on the object of improving a rotatable knob in this respect so that a problem-free fixation and release of the apparatus support is ensured.

SUMMARY OF THE INVENTION

The object of the invention is achieved by providing a rotatable knob of the type described above by having the clamping disc guided in the knob shell and rotatably arranged on the sleeve so that on rotation of the knob shell, the clamping disc executes a synchronous rotary movement with the knob shell and a linear movement with respect to the knob shell.

Since the knob shell 1 and the clamping disc 6 are turned with one another the clamping disc 6 merely executes a linear movement. Thus the over-rotation of the knob shell with respect to the screw is no longer possible. Through the guidance of the clamping disc 6 in the knob shell 1 canting of the clamping disc 6 in the thread turns of the sleeve 3 is prevented. Both measures assist the clamping action between the screw 5 and the clamping disc 6 so that a further rotation of the knob shell 1 is prevented.

The clamping action can be straight forwardly cancelled by rotation of the knob shell 1 in the opposite direction.

It is of advantage that, when a flange 21 is formed at the coupling part 2 and contacts the sleeve 3 when the rotatable knob is installed. In this way an undesired turning off of the knob shell 1 is prevented.

It is of advantage when a ring scale 7 having at least one marking is rotatably arranged at the periphery of the knob shell 1, which can be aligned, after the setting of the fixing force, with a marking provided at the cover disc 4 in order to facilitate the setting on renewed fixation.

The invention will be explained in the following with reference to the accompanying figures. There are shown:

DETAILED DESCRIPTION OF THE PREFERRED EMBODIMENT

Figure 1:
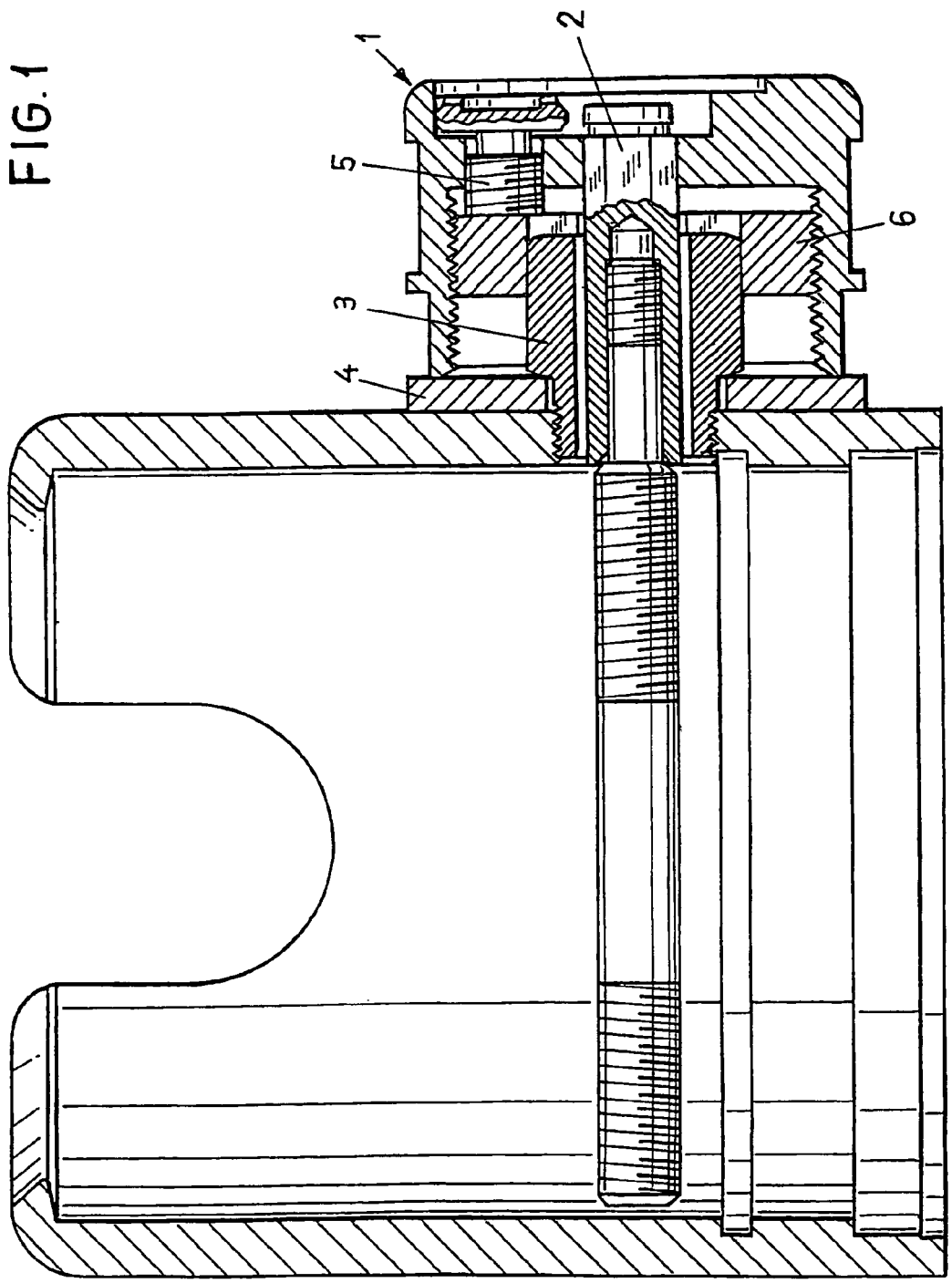
FIG. 1 a section through a known embodiment of a rotatable knob.
Figure 2:
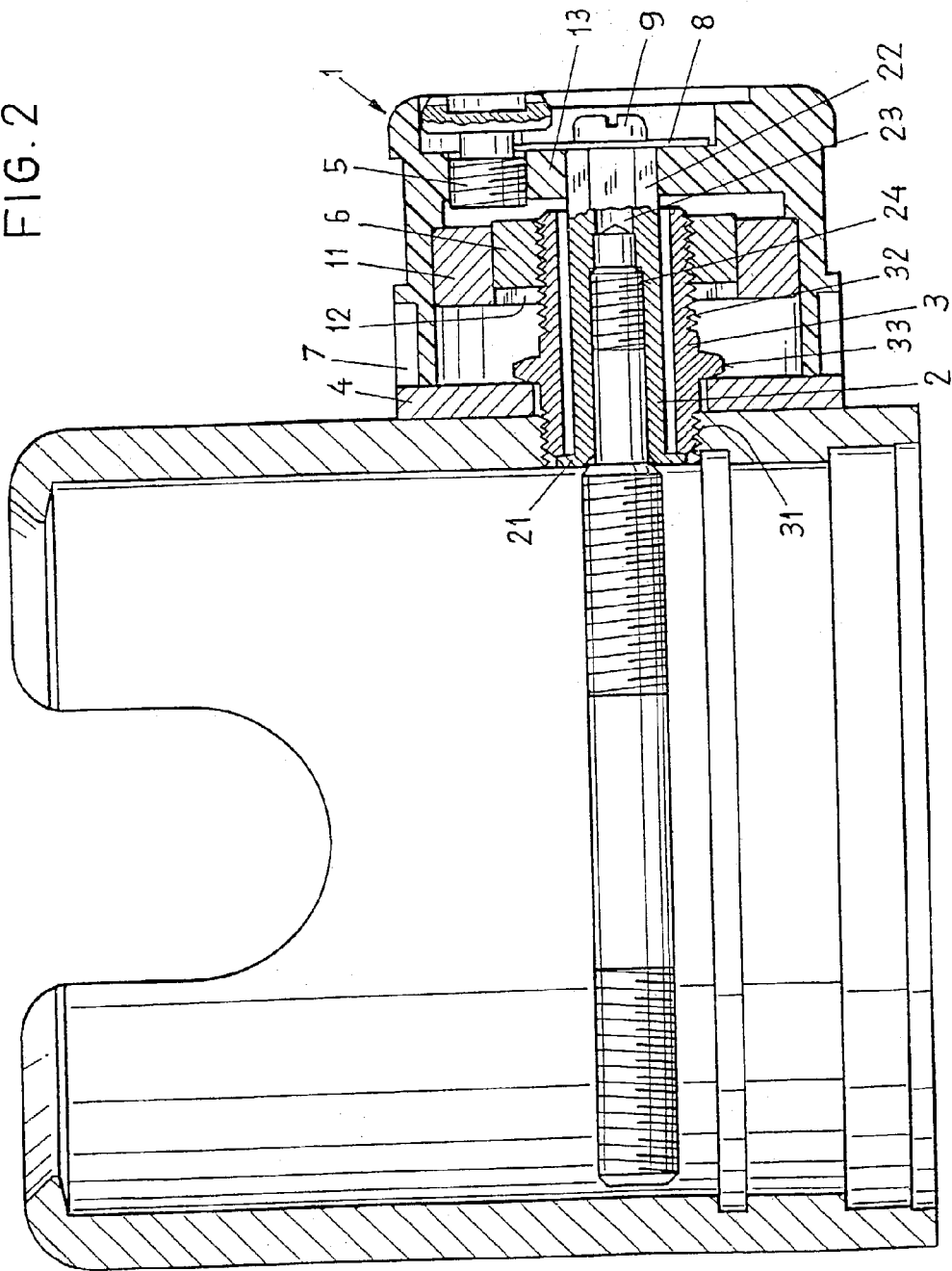
FIG. 2 a section through an embodiment in accordance with the invention with the apparatus support released and FIG. 3 the section in accordance with FIG. 2 with the apparatus support fixed.

As FIG. 2 shows the rotatable knob has a knob shell 1, a coupling part 2 for the connection of the knob shell 1 to the spindle, a sleeve 3, a cover disc 4, a screw 5 for setting the holding force, a clamping disc 6, a ring scale 7 and a member 8 for securing the screw against being lost. The knob shell 1 consists of plastic or of metal.

The knob shell 1 has a guide part 11 having a hexagonal aperture 12 which is secured in the knob shell 1 and a threaded aperture in the base 13 of the shell. The coupling part 2 has a flange 21 at one end, a hexagonal section 22 at the other end and also a through-bore 23 having a first thread section 24 and a second thread section 25. The coupling part 2 is screwed onto the spindle at the first thread section 24. The sleeve 3 has a first thread section 31, a second thread section 32 and also a six-sided section 33 and is secured by the first thread section 31 to the housing. The sleeve 3 surrounds the coupling part 2 and contacts the flange 21. The cover disc 4 is secured contacting the housing by means of the sleeve 3. The screw 5 is turned into the threaded aperture in the base of the shell. The clamping disc 6 is designed as a hexagonal nut and is screwed onto the second threaded section 32 and also arranged in the internal hexagon of the guide part 11. The ring scale 7 is rotatably arranged on the knob shell 1. The knob shell 1 and a securing member 8 are held by means of a screw 9 at the coupling part 2.

Figure 3:
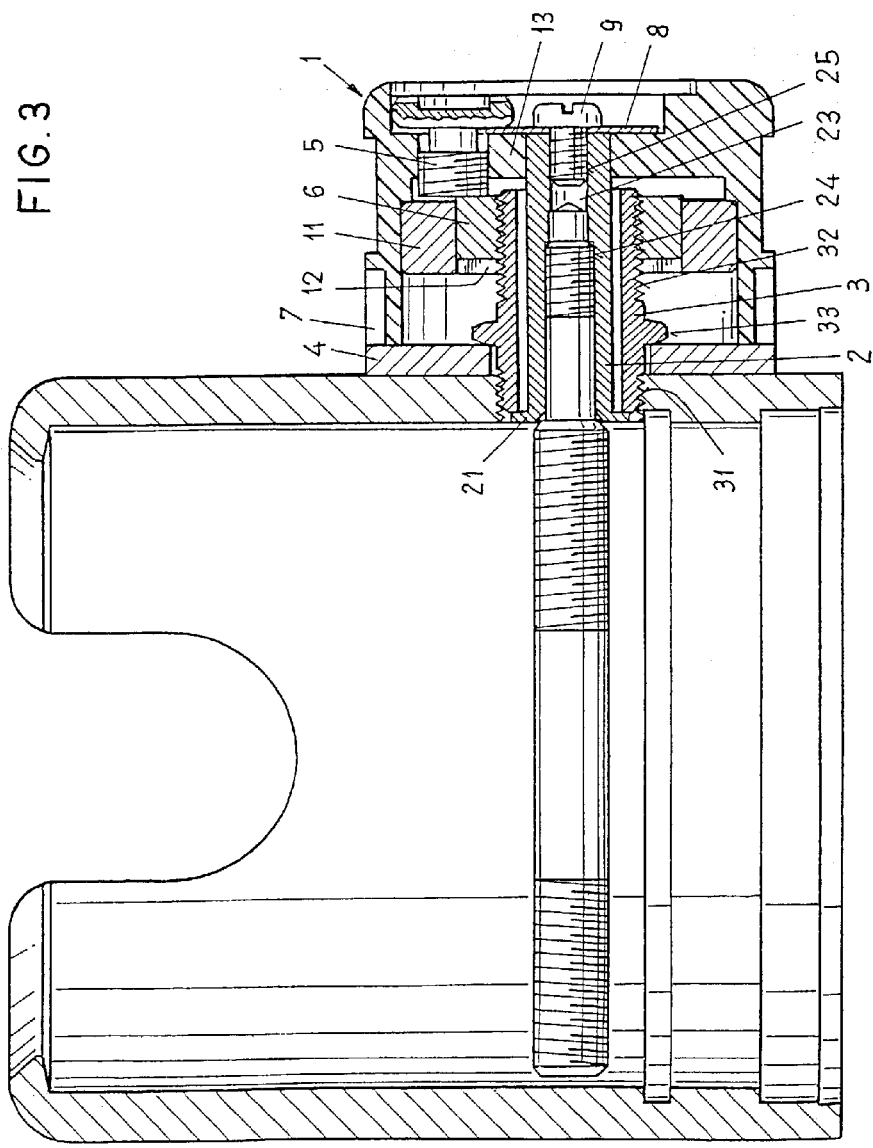

In order to fix the apparatus support the knob shell 1 and the clamping disc 6 are jointly turned in the clock-wise sense and the clamping disc 6 is thereby displaced linearly with respect to the knob shell until the apparatus support is fixed. Thereafter the setting screw 5 is screwed in until it contacts the clamping disc 6. In this way the required holding force is set and simultaneously stored so that on renewed fixation, after each release of the apparatus support, the same position of the clamping disc 5 and the same holding force is always achieved (FIG. 3). In order to facilitate the fixation of the apparatus support the ring scale 7 and the cover disc 4 are provided at the periphery with a marking.

The rotatable knob can for example be provided at a support or tripod head which is disclosed in EP A 0 349 948.

The invention claimed is:

1. Rotatable knob for the fixation of an apparatus support in a housing by means of an apparatus having a spindle, said rotatable knob having a knob shell (1), a coupling part (2) for the connection of the knob shell to the spindle, a sleeve (3) which is connectable to the housing, a cover disc (4) which is secured to the housing by the sleeve (3), a screw (5) arranged in the base (13) of the shell for the setting of the holding force and a clamping disc (6) which cooperates with the knob shell (1) and the sleeve (3) so that, on rotation of the knob shell (1), the clamping disc (6) executes a relative movement and can be brought into engagement with the screw (5) to restrict the rotation of the knob shell (1), characterized in that the clamping disc (6) is guided in the knob shell (1) and rotatably arranged on the sleeve (3) so that, on rotation of the knob shell (1), the clamping disc (6) executes a synchronous rotary movement with the knob shell (1) and a linear movement with respect to the knob shell (1).

2. Rotatable knob in accordance with claim 1, characterized in that the coupling part (2) has a flange (21).

3. Rotatable knob in accordance with claim 1, characterized in that the cover disc (4) is provided with a marking at the periphery.

4. Rotatable knob in accordance with claim 2, characterized by a ring scale (7) which is rotatably arranged at the periphery of the knob shell (1).

5. Rotatable knob in accordance with claim 3, characterized in that the ring scale (7) has at least one marking at the periphery.

6. Rotatable knob in accordance with claim 3, characterized by a securing member (8) for the adjustment screw (5).

7. Rotatable knob in accordance with claim 1, characterized in that the knob shell (1) consists of plastic or metal.

* * * * *